United States Patent
Steinberg et al.

(10) Patent No.: US 6,866,426 B1
(45) Date of Patent: Mar. 15, 2005

(54) OPEN FACE OPTICAL FIBER ARRAY FOR COUPLING TO INTEGRATED OPTIC WAVEGUIDES AND OPTOELECTRONIC SUBMOUNTS

(75) Inventors: Dan A Steinberg, Radford, VA (US); David W Sherrer, Radford, VA (US); Mindaugas F Dautartas, Radford, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/614,155

(22) Filed: Jul. 11, 2000

Related U.S. Application Data (60) Provisional application No. 60/195,636, filed on Apr. 7, 2000.

(51) Int. Cl.[7] .................................................. G02B 6/36
(52) U.S. Cl. ............................................ 385/83; 385/65
(58) Field of Search ............................. 385/83, 65, 55, 385/137

(56) References Cited

U.S. PATENT DOCUMENTS

| | | | |
|---|---|---|---|
| 4,165,496 A | 8/1979 | Di Domenico, Jr. et al. | |
| 4,217,032 A | 8/1980 | Sheem | |
| 4,296,995 A | 10/1981 | Bickel | |
| 4,639,074 A | * 1/1987 | Murphy ........................ | 385/49 |
| 4,750,804 A | 6/1988 | Osaka et al. | |
| 4,756,590 A | 7/1988 | Forrest et al. ........... | 350/96.15 |
| 4,818,059 A | 4/1989 | Kakli et al. | |
| 4,900,118 A | 2/1990 | Yanagawa et al. | |
| 5,073,003 A | 12/1991 | Clark ........................... | 385/33 |
| 5,123,068 A | 6/1992 | Hakoun et al. | |
| 5,163,113 A | 11/1992 | Melman ....................... | 385/31 |
| 5,181,263 A | 1/1993 | Derfiny ........................ | 385/24 |
| 5,185,835 A | 2/1993 | Vial et al. | |

(List continued on next page.)

FOREIGN PATENT DOCUMENTS

| | | | |
|---|---|---|---|
| DE | 3914835 C1 | 7/1990 | |
| EP | 0 395 854 B1 | 7/1994 | |
| JP | 10227948 A | * 8/1998 | ............ G02B/6/40 |

*Primary Examiner*—Hae Moon Hyeon
(74) *Attorney, Agent, or Firm*—Jonathan D. Baskin (57) ABSTRACT

An optical fiber array having a V-groove chip with a front portion and a rear portion. The optical fibers are disposed in the V-grooves. The optical fibers are bnonded (e.g. glued) to the V-groove chip in the rear portion of the chip. The optical fibers are not bonded to the front portion of the chip. Preferably, the optical fibers have endfaces that are flush with a front face of the chip. The optical fibers extend from the rear portion. In use, the optical fiber array is pressed against V-grooves of an integrated optics chip or optoelectronic submount. Since the optical fibers are not bonded to the front portion, they can move slightly to fit precisely into V-grooves of the IO chip or submount. Hence, optical fiber alignment is improved. Also, there is no danger of residual adhesive preventing close contact between the optical fibers and IO chip.

31 Claims, 7 Drawing Sheets

U.S. PATENT DOCUMENTS

| | | | |
|---|---|---|---|
| 5,297,228 A * | 3/1994 | Yanagawa et al. | 359/900 |
| 5,384,872 A * | 1/1995 | Jacobs-Cook et al. | 385/31 |
| 5,390,266 A | 2/1995 | Heitmann et al. | |
| 5,390,271 A | 2/1995 | Priest | 385/92 |
| 5,479,540 A | 12/1995 | Boudreau et al. | 385/14 |
| 5,499,309 A | 3/1996 | Kozuka et al. | 385/38 |
| 5,499,312 A | 3/1996 | Hahn et al. | 385/91 |
| 5,535,296 A | 7/1996 | Uchida | 385/89 |
| 5,557,695 A | 9/1996 | Yamane et al. | |
| 5,566,262 A | 10/1996 | Yamane et al. | |
| 5,568,585 A | 10/1996 | Kramer | |
| 5,577,142 A | 11/1996 | Mueller-Fiedler et al. | 385/47 |
| 5,627,931 A | 5/1997 | Ackley et al. | 385/88 |
| 5,926,599 A * | 7/1999 | Bookbinder et al. | 385/137 |
| 5,961,683 A | 10/1999 | Mizuta et al. | |
| 5,970,200 A | 10/1999 | Takikawa et al. | |
| 6,048,107 A | 4/2000 | Pubanz | 385/92 |
| 6,056,696 A | 5/2000 | Kallman | |
| 6,062,741 A | 5/2000 | Tachigori | 385/88 |
| 6,081,638 A | 6/2000 | Zhou | 385/31 |
| 6,086,704 A | 7/2000 | Kanai et al. | |
| 6,101,306 A * | 8/2000 | Engstrand et al. | 385/137 |
| 6,103,344 A * | 8/2000 | Ota et al. | 385/65 |
| 6,132,107 A | 10/2000 | Morikawa | 385/89 |
| 6,163,639 A * | 12/2000 | Ollier et al. | 385/14 |
| 6,215,946 B1 * | 4/2001 | Sherrer | 385/137 |
| 6,241,399 B1 | 6/2001 | Nobuhara | 385/84 |
| 6,257,772 B1 * | 7/2001 | Nakanishi et al. | 257/432 |
| 6,263,137 B1 * | 7/2001 | Yoneyama et al. | 385/49 |
| 6,363,201 B2 | 3/2002 | Sherrer et al. | |
| 6,523,204 B1 | 2/2003 | Sherrer et al. | |
| 6,595,700 B2 | 7/2003 | Steinberg et al. | |

* cited by examiner

OPEN FACE OPTICAL FIBER ARRAY FOR COUPLING TO INTEGRATED OPTIC WAVEGUIDES AND OPTOELECTRONIC SUBMOUNTS

RELATED APPLICATIONS

The present application claims the benefit under 35 U.S.C. 119(e) provisional patent application 60/195,636, filed on Apr. 7, 2000, which is hereby incorporated by reference.

FIELD OF THE INVENTION

The present invention relates generally to structures for coupling to integrated optical devices. More particularly, the present invention relates to an optical fiber array having an open top face for coupling to integrated optics (IO) chips that have V-grooves for receiving optical fibers. The arrays of the present invention allow many optical fibers to be aligned and bonded to an IO chip simultaneously.

BACKGROUND OF THE INVENTION

Integrated optics (IO) chips have waveguides that typically must be coupled to optical fibers. Coupling to optical fibers is difficult because the fibers must be accurately aligned with the waveguides.

In order to provide passive coupling alignment between optical fibers and IO waveguides, IO chips may have V-grooves aligned collinearly with the waveguides. An optical fiber disposed in the V-groove is automatically aligned with the IO waveguide.

U.S. Pat. No. 5,123,068 to Hakoun et al. discloses an IO chip having V-grooves for fiber alignment. In the device of Hakoun et al., the optical fibers must be placed in the V-grooves individually, a tedious task.

U.S. Pat. Nos. 5,961,683 and 5,557,695 disclose IO chips having V-grooves in a substrate underlying the waveguides. Fibers placed in the V-grooves are aligned with the waveguides.

U.S. Pat. No. 4,818,059 to Kakii et al. discloses an optical connector having a V-groove chip that is only partially covered by a lid. Exposed V-grooves facilitate the insertion of optical fibers into the V-grooves between the chip and lid.

Individual placement of optical fibers in fiber aligment grooves is time consuming and tedious. It would be an advance in the art to provide a structure and method for placing simultaneously a large number of fibers in fiber alignment grooves.

OBJECTS AND ADVANTAGES OF THE INVENTION

Accordingly, it is a primary object of the present invention to provide an open-face optical fiber array that:

1) can be mated with an integrated optics chips having fiber alignment grooves for accurately locating a large number of optical fiber simultaneously;

2) is simple to construct and can be used for a wide range of optical fiber pitches.

These and other objects and advantages will be apparent upon reading the following description and accompanying drawings.

SUMMARY OF THE INVENTION

These objects and advantages are attained by an optical fiber array having a V-groove chip with V-grooves and an optical fiber disposed in a V-groove. The V-groove chip has a rear portion and a front portion. The front portion has a front face. The optical fiber is bonded (e.g. glued, soldered, or thermo-compression bonded) to the rear portion; the optical fiber is not bonded to the front portion. Preferably, the optical fiber endface is flush with a front face of the V-groove chip.

The array can also have micromachined pits for receiving a alignment spheres (e.g. alignment spheres).

A wick stop trench can be disposed between the rear portion and the front portion to control the flow of adhesive (e.g. (glue or solder).

The present invention also includes an embodiment where the chip has a rear portion, a middle portion and a bonded front portion. The optical fibers are bonded to the chip in the rear portion and the bonded front portion; the optical fibers are not bonded to the middle portion. In this embodiment, the middle portion mates with the V-grooves of an IO chip.

The present invention also includes a method for bonding optical fibers to an optical device (e.g. IO chip or optoelectronic submount).

DETAILED DESCRIPTION

Figure 1:
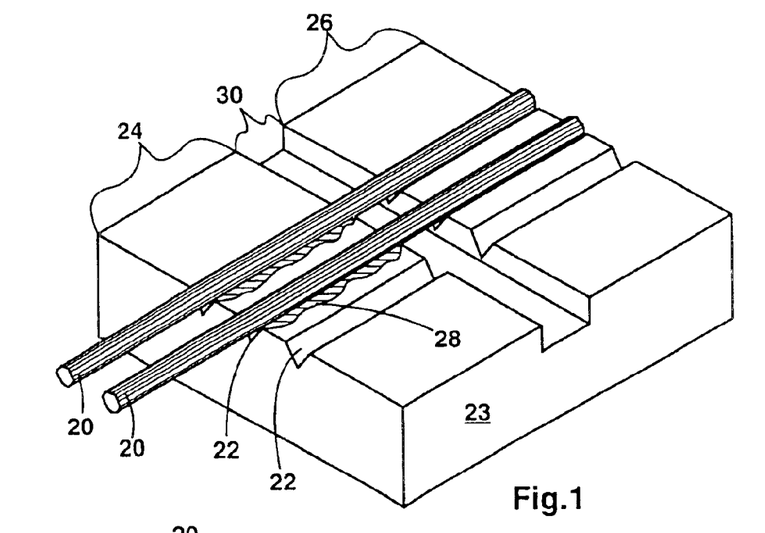
FIG. 1 shows a perspective view of the open face fiber array of the present invention.

The present invention provides an open-face optical fiber array for coupling to substrates (e.g. integrated optics (IO)

chips) having optical fiber alignment grooves. The open-face array has a V-groove chip with optical fibers disposed in the V-grooves. The V-groove chip has a rear portion where the fibers are bonded in the V-grooves (e.g. with glue), and a front portion where the optical fibers are NOT bonded to the V-grooves. The front portion has a front face that is preferably polished. The optical fibers extend from the rear portion. The optical fibers have endfaces that are preferably flush with the front face. A lid may be disposed on top of the rear portion where the optical fibers are bonded. In use, the array of the present invention is mated with an IO chip so that the unbonded optical fibers are pressed into the V-grooves of the IO chip. Since there is no glue on the optical fibers in the unbonded front portion, the fibers can be accurately aligned in the IO chip V-grooves FIG. 1 shows a perspective view of an open face optical fiber array according to the present invention. The open face fiber array has optical fibers 20 disposed in precision V-grooves 22 of a V-groove chip 23. For clarity, one V-groove in the array does not have a fiber. The array has a rear portion 24 and a front portion 26. The front and rear portions may be the same or different lengths (in the direction of the V-grooves). In the rear portion 24, the optical fibers are bonded to the V-groove chip 23; in the front portion 26, the optical fibers are necessarily NOT bonded to the V-groove chip 23. In the present specification, the rear portion 24 is defined as a region where the fibers are bonded to the chip 23. The front portion is defined as a region where the optical fibers are not bonded to the chip 23. Preferably, the optical fibers 20 are bonded to the rear portion 24 with glue 28. Optionally, the optical fibers can be bonded to the rear portion 24 with solder or other materials or by using other techniques (e-g. thermo-compression bonding). The front portion is 1–10 millimeters long. The rear portion is 0.2–5 millimeters long.

In a preferred embodiment of the invention where glue is used to bond the optical fibers 20, a wick stop trench 30 is provided. The wick stop trench 30 separates the rear portion 24 and the front portion 26. The wick stop trench serves to prevent the flow of liquid glue by capillary action to the front portion 26. The wick stop trench is described in copending patent application Ser. No. 09/526,922, which is hereby incorporated by reference. The wick stop trench is optional, but preferred, in embodiments where flowable glues (e.g. UV- or heat-curable epoxy) or liquid solders are used to bond the optical fibers to the chip 23.

If a wick stop trench is not used, then highly viscous glues with low capillary flow can be used to bond the optical fibers to the chip. Viscous glues tend to not flow to the front portion 26 from the rear portion 24.

In an alternative embodiment of the present invention, thermo-compression bonding is used to bond the optical fibers to the rear portion. For example, U.S. Pat. Nos. 5,389,193 and 5,178,319 disclose useful methods of aluminum thermo-compression bonding for bonding optical fibers to V-grooves. In the case where aluminum thermo-compression is used, it is preferable to only deposit aluminum in the rear portion of the V-groove chip. In this way, the optical fiber is only bonded to the rear portion.

Figure 2:
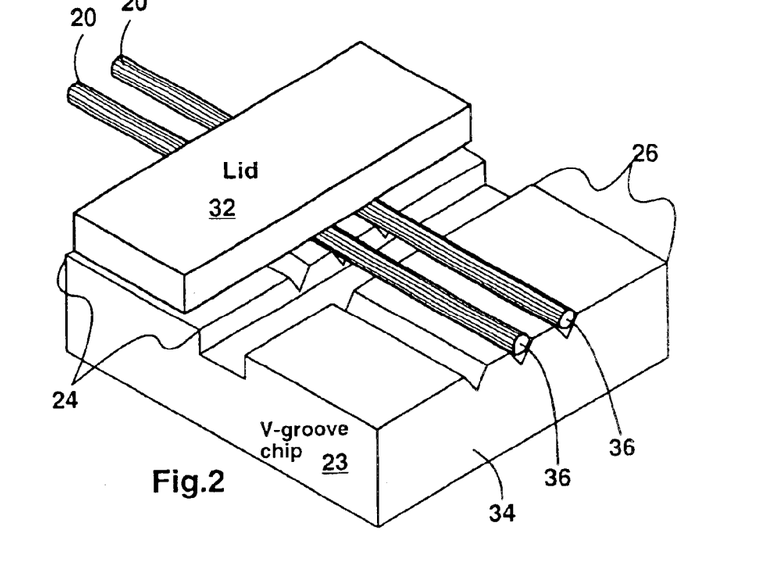
FIG. 2 shows a second perspective view of the fiber array where the fiber array has a lid.

FIG. 2 shows another perspective view of the open face fiber array. The array in FIG. 2 has an optional lid 32 covering the rear portion 24. The lid 32 is preferably glued to the optical fibers and chip 23. The array has a front face 34 at the edge of the front portion 26. The optical fibers 20 have fiber endfaces 36. The endfaces can be cleaved or polished; preferably, the endfaces 36 are polished. The fiber endfaces 36 can be located within 1 millimeter of the front face. Also preferably, the fiber endfaces 36 are flush with the front face 34. In a particularly preferred embodiment, the front face 34 and fiber endfaces 36 are polished in the same polishing step. This assures that the fiber endfaces 36 and the front face 34 are flush.

Figure 3:
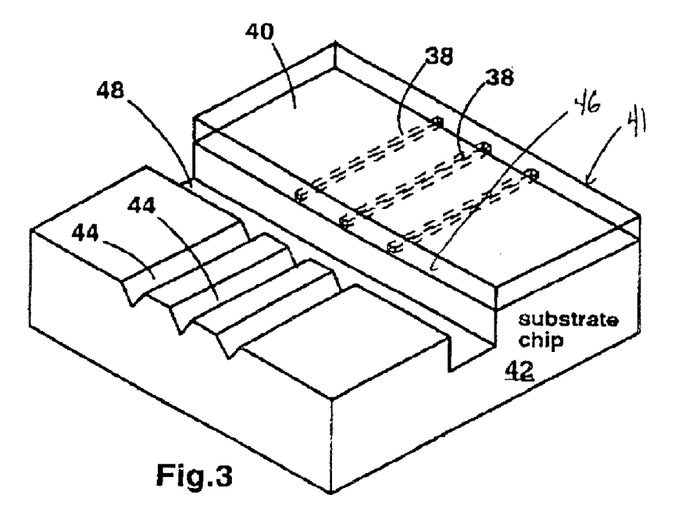
FIG. 3 shows an integrated optics chip structure that can be coupled to the present optical fiber array.

FIG. 3 shows a perspective view of an integrated optics chip structure that can be coupled to the optical fiber arrays of the present invention. The integrated optics (IO) 41 chip has waveguides 38 disposed in a cladding material 40. The waveguides and cladding are disposed on a substrate chip 42 (e.g. made of silicon). The waveguides 38 and cladding can be made of silicon, polymer materials or silica. V-grooves 44 for aligning optical fibers are disposed in alignment with the waveguides 38. The waveguides 38 intersect a sidewall 46 that is smooth enough for optical coupling to the waveguides. The V-grooves 44 and waveguides 38 are separated by a cut groove 48. The cut groove may be a dicing saw cut groove, for example. The use of a dicing saw cut groove in IO chips is known in the art.

The cut groove 48 preferably has a width less than 5–6 times the diameter of the optical fiber so that bending of the optical fiber in the region of the cut groove is minimized. For example, for 125 micron diameter optical fibers, the cut groove 48 should have a width less than about 700 microns.

More preferably, the cut groove has a width less than about 300 or 150 microns.

It is noted that the present optical fiber arrays can be used to couple to IO chips that do not have cladding material 40 disposed on the waveguides. For example, the waveguides can be made of polymer material disposed directly on the substrate chip or a cladding layer.

Figure 4:
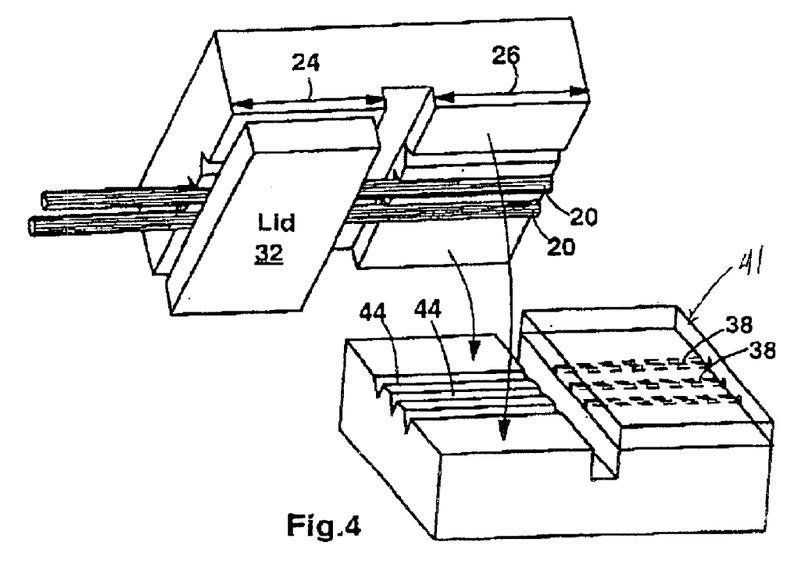
FIG. 4 shows a perspective view of the fiber array and an IO chip illustrating how the fiber array and IO chip are coupled.

FIG. 4 illustrates how the optical fiber arrays of the present invention mate with the IO chip shown in FIG. 3. In the present invention, the optical fibers 20 in the array are pressed into the V-grooves 44 of the IO chip. Since the optical fibers 20 are not bonded to the front portion 26, the fibers can shift slightly to fit perfectly within the IO chip v-grooves 44. It is important to note that only the front portion 26 is mated with the IO chip. Also, since the fibers are not bonded in the front portion 26, there is no danger of residual, hardened glue interfering with contact between the fibers 20 and the IO chip V-grooves 44. This is an important consideration because even a very thin film (e.g. 1–3 microns) of glue residue on top of the fibers 20 can significantly harm fiber-waveguide alignment.

After the optical fibers 20 are disposed in the v-grooves 44, glue or solder is applied to bond the fibers to the IO chip. Preferably, the optical fiber endfaces 36 are butted against the waveguides 38. The interface between the optical fibers and the waveguides can be oriented at a nonperpendicular angle with respect to the optical fibers and waveguides to reduce backreflections. In this case, the front face 34 and the cut groove 49 should be cut at precisely matching angles.

Figure 5:
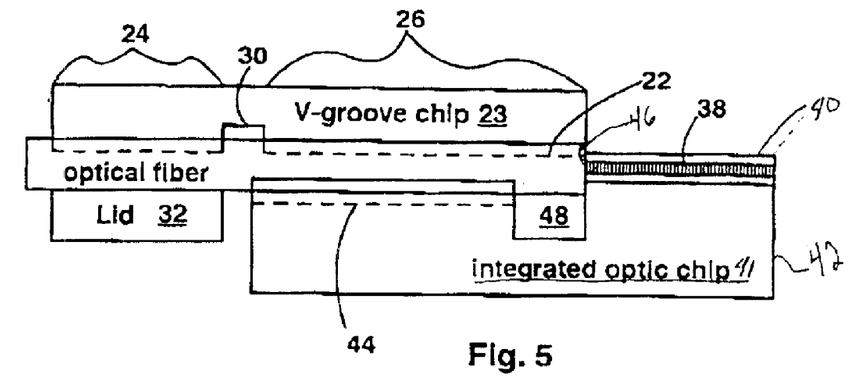
FIG. 5 shows a side view of the fiber array and IO chip coupled.

FIG. 5 shows a side view of the present fiber array coupled to an IO chip.

Figure 6:
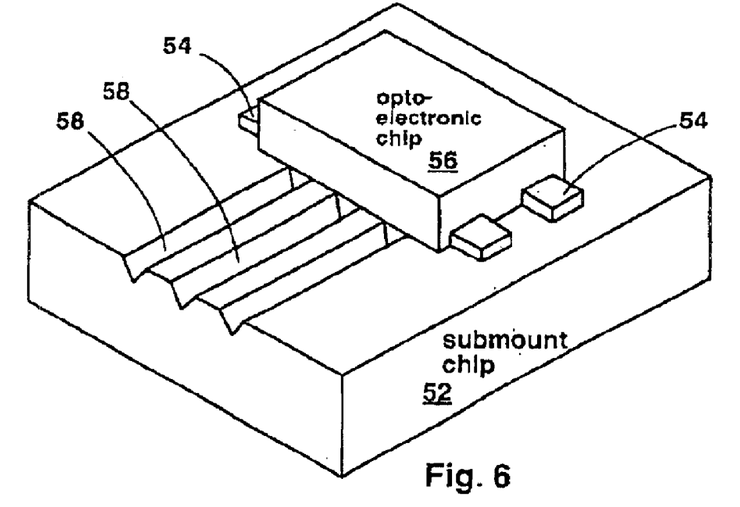
FIG. 6 shows a perspective view of an optoelectronic submount that can be coupled to the present fiber array.

The fiber arrays are also useful for coupling optical fibers to optoelectronic submounts. The optoelectronic submount can have a laser array or photodetector array disposed adjacent to V-grooves. FIG. 6 shows an exemplary optoelectronic submount that can be coupled to the present fiber array. The submount has a submount chip 52 with pedestals 54 for alignment of an optoelectronic chip 56. The submount chip also has V-grooves 58 for positioning optical fibers. The submount chip may also have a cut groove analogous to cut groove 48 in the IO chip of FIG. 3. However, it is generally preferable for the submount chip to not have a cut groove (i.e., analogous to cut groove 48). This is because a cut groove can contribute to fiber misalignment. It is also noted that an IO chip can be substituted for the optoelectronic chip 56.

Figure 7:
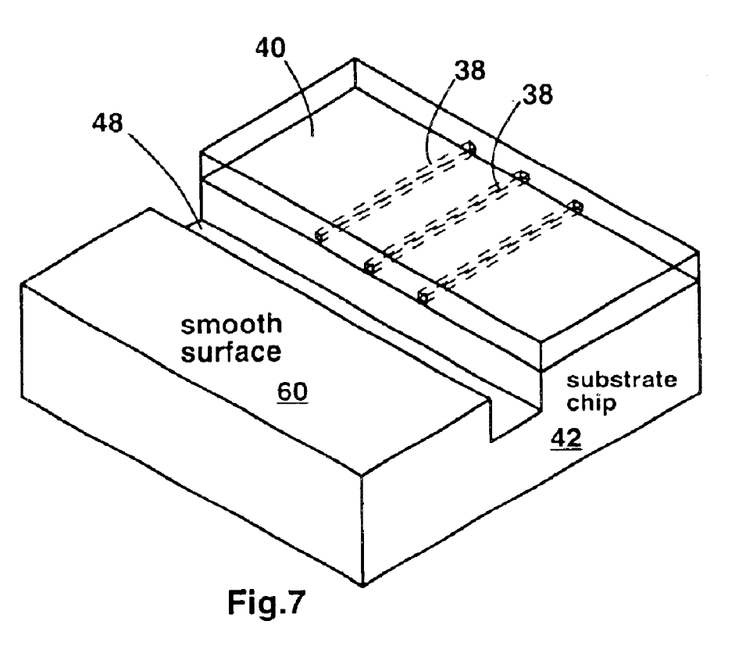
FIG. 7 shows an IO chip having a smooth surface for contact with the optical fibers.

FIG. 7 shows an alternative embodiment where the IO chip does not have V-grooves 44. Instead, surface 60 is smooth. The fiber array of the present invention can be coupled to this structure by pressing the optical fibers against the smooth surface 60. After the fibers are actively aligned, the optical fibers are bonded to the smooth surface 60 using glue or solder.

Figure 8A:
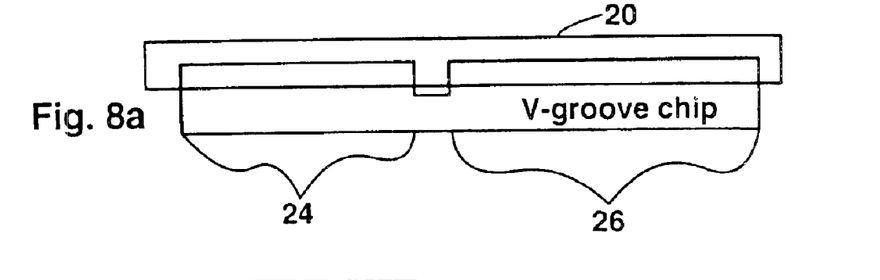
FIGS. 8a–8e illustrate a method for making the optical fiber array of the present invention.

FIGS. 8a–8e illustrate a method for making the optical fiber array of the present invention. The steps for making the fiber array are as follows:

FIG. 8a: Optical fibers are disposed in the v-grooves of the V-groove chip.

Figure 8B:
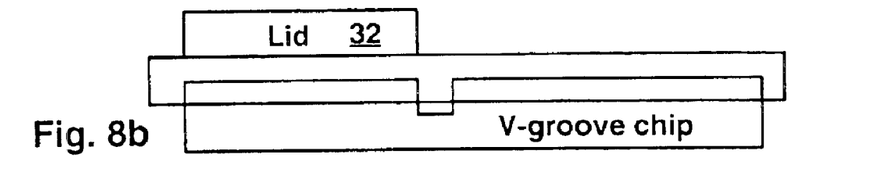

FIG. 8b: A lid 32 is placed on top of the optical fibers on the rear portion 24. Glue is applied to the rear portion to adhere the lid 32, fibers and v-groove chip.

Figure 8C:
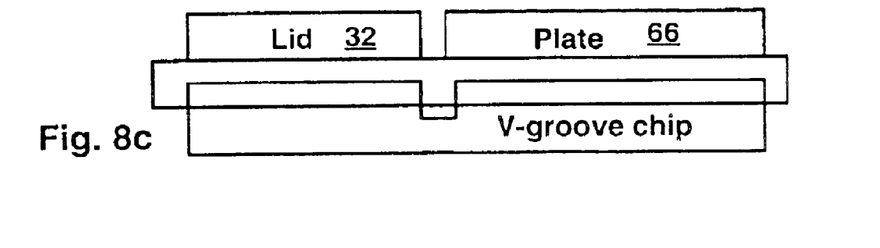

FIG. 8c: A temporary holding plate 66 is pressed against the front portion 26. The plate is not glued to the fibers. The plate 66 may be pressed against the fibers using a metal spring or clamp. The plate 66 may have V-grooves or may be flat.

Figure 8D:
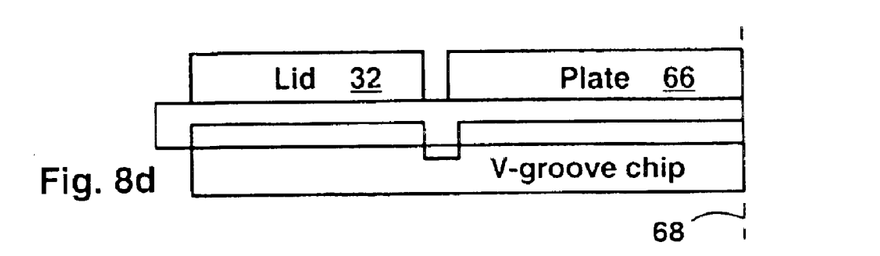

FIG. 8d: The front portion and optical fiber 20 (and, optionally the plate 66) are lapped and polished to plane 68. The plane 68 can be perpendicular to the optical fibers, or set at an angle to the optical fibers. Plane 68 may be set at an angle in order to reduce backreflections. This is particularly useful in applications where the cut groove 48 in the IO chip is cut at an angle. In this case, angles of the plane 68 and cut groove 48 should match.

Figure 8E:
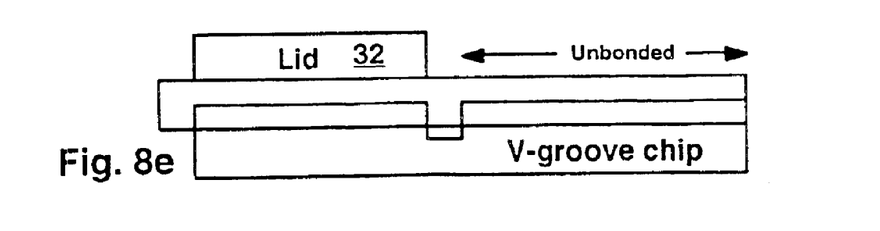

FIG. 8e: The plate 66 is removed. Optical fibers are not bonded to the V-groove chip in the front portion 26. The optical fibers have polished endfaces 36 that are accurately flush with the front face 34 of the V-groove chip.

Alternatively, the lid 32 is removed after the fibers are glued. The lid 32 can have a nonstick (e.g. PTFE) coating to prevent glue from bonding the lid 32 to the array.

Figure 8F:
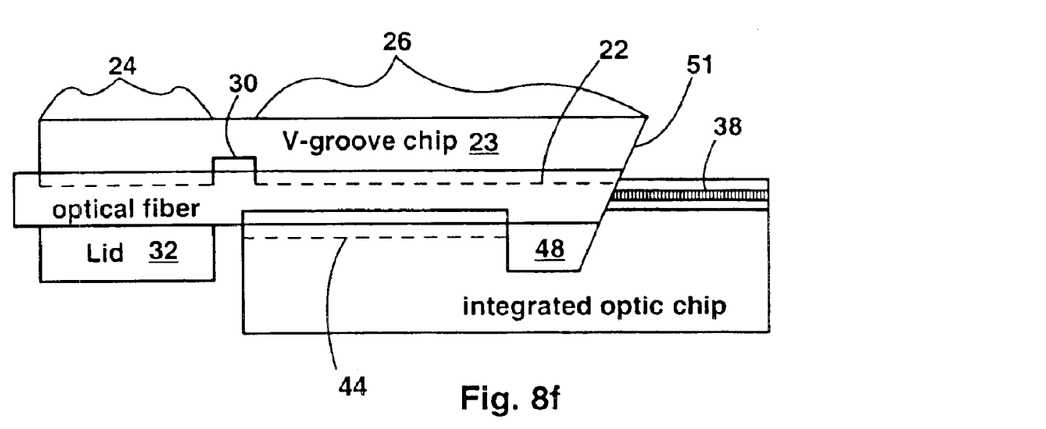
FIG. 8f shows an alternative embodiment of the present invention where the array has an angled front face. The front face is angled forward so that it overhangs the IO waveguide structure.

FIG. 8f shows a side view of an array with an angled front face 51 mated with an IO chip. In this specific embodiment, the front face 51 is angled forward so that it overhangs the waveguide 38. This is preferable because the angled waveguide 38 tends to push the optical fiber into the V-groove 22. The fiber array and waveguide can be angled at about 5–20 degrees, for example, to reduce backreflections. It is noted that the fiber array and waveguide can be angled 'backward' as well, so that the waveguide 'overhangs' the optical fiber 20.

Figure 9:
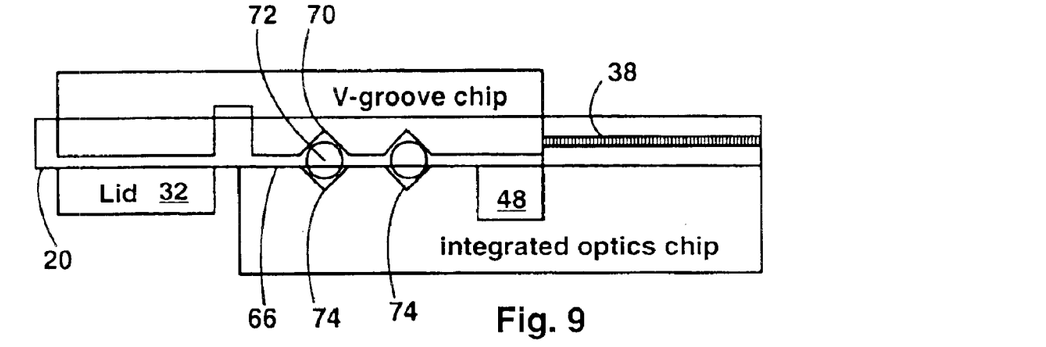
FIG. 9 shows an alternative embodiment having alignment spheres for providing alignment between the array and IO chip.

FIG. 9 shows an embodiment where the optical fiber array has pits 70 for receiving alignment spheres 72 (e.g. ball lenses) that mate with pits 74 on the integrated optics chip. The optical fibers 20 are in contact with the smooth surface 60. Alternatively, the pits 70 74 are used in combination with V-grooves 44 in the IO chip.

Figure 10:
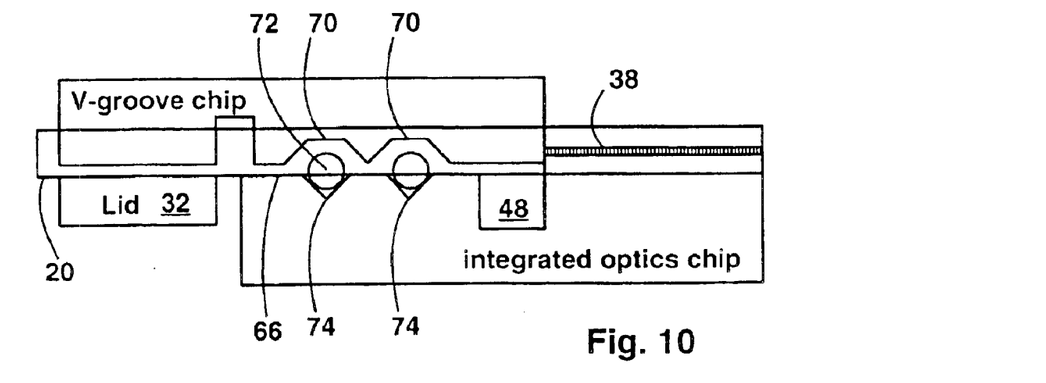
FIG. 10 shows an alternative embodiment where the pits for the alignment spheres are large enough to allow active positioning of the fiber array.

FIG. 10 shows another embodiment where the pits 70 are made wider than the alignment spheres 72 so that the optical fiber array can move slightly on the smooth surface 60 alternatively, pits 74 are made wider than the alignment spheres). Of course, this feature is only applicable if the IO chip has the smooth surface 60. By allowing the optical fiber array to move slightly, both active and passive alignment can be provided; passive alignment is provided by mating the pits and alignment spheres, and active alignment is allowed because the alignment spheres can move slightly (e.g. 10–20 microns) within the pits.

Figure 11:
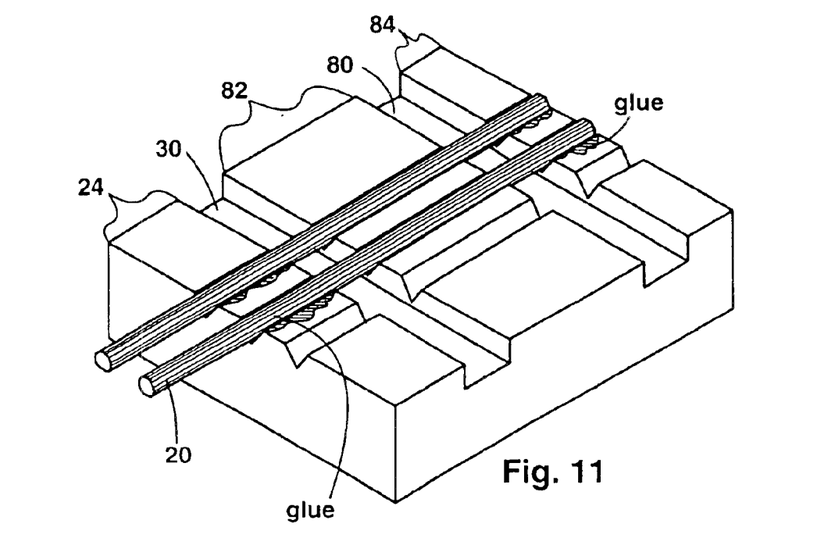
FIG. 11 shows an alternative embodiment of the present invention where the optical fiber is bonded to the rear portion and a bonded front portion; the optical fiber is not bonded in a middle portion of the array.

FIG. 11 shows another aspect of the present invention where the array has a second wick stop trench 80. The first wick stop trench 30 and second wick stop trench 80 divide the fiber array into three parts: the rear portion 24, a middle portion 82, and a bonded front portion 84. The fibers 20 are bonded to the rear portion 24 and the bonded front portion 84. The fibers are not bonded to the middle portion 82. Preferably, the fibers are in close contact with the V-grooves in the middle portion; the fibers must not be buckled or bent in the middle portion 82. Also, it is noted that the bonded front portion 84 is relatively short (preferably less than 1 mm long). Generally, the bonded front portion is 0.2–2 millimeters long. The rear portion is 0.2–5 millimeters long. The bonded front portion 84 must be shorter than the width of the cut groove 48 in the IO chip.

The embodiment of FIG. 11 solves a potential problem with the array of FIGS. 1 and 2. In the arrays of FIGS. 1 and 2, the optical fiber can bend slightly in the area of the cut groove 48 thereby causing misalignment between the optical fiber and IO wavgeuide 38. The fiber can bend slightly in the area of the cut groove 48 because the fiber is not bonded to the V-groove 22.

By comparison, the optical fiber 20 cannot bend in the area of the cut groove 48 when the array of FIG. 11 is used. This is because the optical fiber 20 is glued to the bonded front portion 84.

Figure 12:
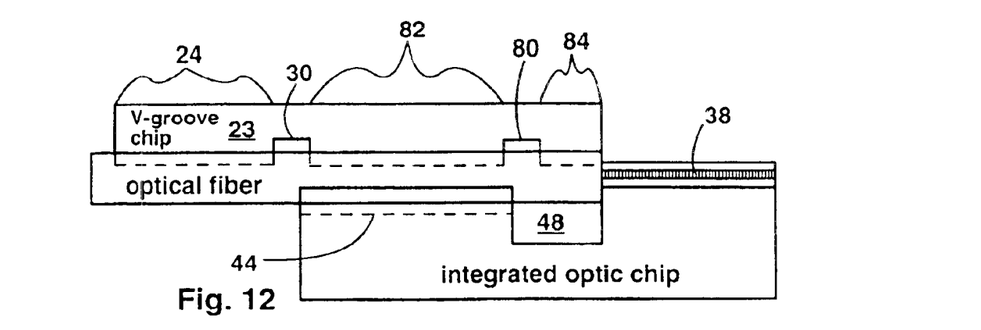
FIG. 12 shows how the array of FIG. 11 is mated with an IO chip.

FIG. 12 shows a side view of the array of FIG. 11 mated with an IO chip. The bonded front portion 84 is shorter than the cut groove 48. Since the optical fibers are bonded to the bonded front portion 84, the fibers cannot become misaligned. Also, the optical fibers are not bonded to the middle portion 82 until after the array is mated with the IO chip. This allows the fibers to seat properly in the V-grooves 44 of the IO chip.

Figure 13:
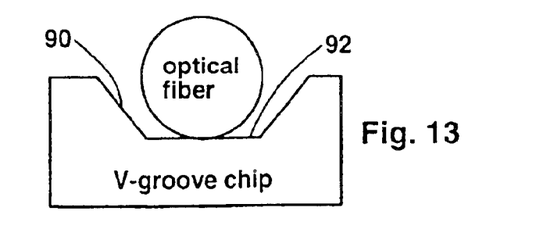
FIG. 13 shows a cross sectional view of the front portion where the V-groove in the front portion is large so that it does not fully define the location of the optical fiber.

In one embodiment, the V-grooves 22 are wider in the front portion 26 than the rear portion 24. In this embodiment, the position of the optical fibers 20 is not fully determined by the V-grooves in the front portion 26. This is advantageous in some applications because it allows the IO chip V-grooves 44 (or, equivalently, the submount chip V-grooves 58) to determined the positions of the optical fibers 20. FIG. 13, for example, shows a cross sectional view of an optical fiber disposed in a V-groove 90 that does not fully determine the position of the the optical fiber. The fiber can move left-right in the V-groove 90 because the optical fiber only contacts a flat bottom surface 92. It is noted, however that the V-groove chip must be able to press the optical fiber into the V-groove 44 of the IO chip. For example, the V-groove 90 has the flat bottom surface 92 that can press the optical fiber into the IO chip V-groove 44.

It is noted that if the fiber array is mated with an IO chip (or submount) having a smooth surface 60 (shown in FIG. 7) then the V-grooves 22 in the front portion 26 must fully define the optical fiber position.

Preferably, the position of the optical fiber in the rear portion is fully defined by the V-grooves, but this is optional.

In the present invention, the V-groove chip is preferably made from silicon using anisotropic etching techniques. Other materials can also be used for the V-groove chip such as glass, ceramics or plastics. In these cases, the V-grooves can be cut using a diamond saw, or the V-groove chips can be molded. The wick stop trenches can be anywhere from 50 microns to 1000 microns wide. The best width for the wick stop trenches depends upon the capillary flow characteristics of the glues or solders used. Also, the wick stop trenches should be deeper than the V-grooves.

It will be clear to one skilled in the art that the above embodiment may be altered in many ways without departing from the scope of the invention. Accordingly, the scope of the invention should be determined by the following claims and their legal equivalents.

What is claimed is:

1. An optical fiber array apparatus for providing optical connections to an integrated optics chip or optoelectronic device, comprising:
   a) a V-groove chip having a V-groove, a rear portion, a front portion, and a front face, and
   b) an optical fiber disposed in the V-groove, wherein:
      1) the optical fiber is bonded to the rear portion of the V-groove chip,
      2) the optical fiber is not bonded to the front portion of the V-groove chip, which is in proximity to the integrated optics chip or optoelectronic device, and
      3) wherein the optical fiber extends from the rear portion.

2. The apparatus of claim 1 wherein the optical fiber has an endface located within 1 millimeter of the front face.

3. The apparatus of claim 1 wherein the V-groove chip has a wick stop trench between the rear portion and the front portion.

4. The apparatus of claim 1 further comprising a lid disposed on top of the optical fibers in the rear portion.

5. The apparatus of claim 1 wherein the optical fiber has an endface that is flush with the front face.

6. The apparatus of claim 1 wherein the front portion is 1–10 millimeters long.

7. The apparatus of claim 1 wherein the rear portion is 0.2–5 millimeters long.

8. The apparatus of claim 1 wherein the front portion has pits for receiving alignment spheres.

9. The apparatus of claim 1 wherein the front face is angled nonperpendicularly with respect to the optical fiber.

10. The apparatus of claim 9 wherein the front face is angled forward.

11. The apparatus of claim 1 wherein the V-grooves is large in the front portion so that a location of an optical fiber is not fully determined by the V-groove in the front portion.

12. The apparatus of claim 11 wherein the V-groove in the front portion has a flat bottom surface.

13. The apparatus of claim 1 wherein the integrated optics chip or optoelectronic device is mounted on a substrate, which is a submount chip or substrate chip.

14. The apparatus of claim 13 wherein the substrate cooperates with the front portion of the V-groove chip to hold the optical fiber.

15. The apparatus of claim 13 wherein the substrate comprises a V-groove, the optical fiber being held between the V-groove of the V-groove chip and the V-groove of the substrate.

16. The apparatus of claim 13 wherein the substrate comprises a V-groove, the optical fiber being held between the V-groove of the front portion of the V-groove chip and the substrate.

17. An optical fiber array apparatus for providing optical connections to an integrated optics chip or optoelectronic device, comprising:
   a) a V-groove chip having a V-groove, a rear portion, a middle portion, a bonded front portion, and a front face, and
   b) an optical fiber disposed in the V-groove, wherein:
      1) the optical fiber is bonded to the rear portion of the V-groove chip,
      2) the optical fiber is not bonded to the middle portion of the V-groove chip,
      3) the optical fiber is bonded to the bonded front portion of the V-groove chip, which is in proximity to the integrated optics chip or optoelectronic device, and
      4) wherein the optical fiber extends from the rear portion.

18. The apparatus of claim 17 wherein the optical fiber has an endface located within 1 millimeter of the front face.

19. The apparatus of claim 17 wherein the V-groove chip has a wick stop trench between the rear portion and the bonded front portion.

20. The apparatus of claim 17 wherein the V-groove chip has a wick stop trench between the middle portion and the bonded front portion.

21. The apparatus of claim 17 further comprising a lid disposed on top of the optical fibers in the rear portion.

22. The apparatus of claim 17 wherein the optical fiber has an endface that is flush with the front face.

23. The apparatus of claim 17 wherein the bonded front portion is 0.2–2 millimeters long.

24. The apparatus of claim 17 wherein the rear portion is 0.2–5 millimeters long.

25. The apparatus of claim 17 wherein the front portion has pits for receiving alignment spheres.

26. The apparatus of claim 17 wherein the front face is angled nonperpendicularly with respect to the optical fiber.

27. The apparatus of claim 17 wherein the integrated optics chip or optoelectronic device is mounted on a substrate, which is a submount chip or substrate chip.

28. The apparatus of claim 27 wherein the substrate cooperates with the front portion of the V-groove chip to hold the optical fiber.

29. The apparatus of claim 27 wherein the substrate cooperates with the front portion and middle portion of the V-groove chip to hold the optical fiber.

30. A method for coupling an optical fiber to an integrated optics chip or optoelectronic device disposed on a substrate, comprising the steps of:
   a) bonding the optical fiber to only a rear portion of a V-groove chip having the rear portion and a front portion;
   b) bonding the optical fiber and front portion of the V-groove chip to the substrate so that the optical fiber is aligned with the integrated optics chip or optoelectronic device.

31. The method of claim 30 further comprising the step of disposing the optical fiber in a V-groove in the substrate, wherein the substrate V-groove is aligned with the integrated optics chip or optoelectronic device.

* * * * *